(12) United States Patent
Oridate et al.

(10) Patent No.: US 11,897,145 B1
(45) Date of Patent: Feb. 13, 2024

(54) PART MODELING FOR PATH GENERATION TO GUIDE ROBOTIC END EFFECTOR

(71) Applicant: Wilder Systems Inc., Austin, TX (US)

(72) Inventors: Ademola Ayodeji Oridate, Austin, TX (US); William Wilder, Austin, TX (US); Spencer Voiss, Austin, TX (US)

(73) Assignee: WILDER SYSTEMS INC., Austin, TX (US)

( * ) Notice: Subject to any disclaimer, the term of this patent is extended or adjusted under 35 U.S.C. 154(b) by 0 days.

(21) Appl. No.: 18/447,295

(22) Filed: Aug. 9, 2023

Related U.S. Application Data

(60) Provisional application No. 63/481,576, filed on Jan. 25, 2023, provisional application No. 63/481,563, filed on Jan. 25, 2023, provisional application No. 63/377,149, filed on Sep. 26, 2022, provisional application No. 63/398,202, filed on Aug. 15, 2022, provisional application No. 63/398,203, filed on Aug. 15, 2022, provisional application No. 63/396,938, filed on Aug. 10, 2022.

(51) Int. Cl.
*B25J 9/16* (2006.01)
*G06F 18/23* (2023.01)

(52) U.S. Cl.
CPC ............. *B25J 9/1671* (2013.01); *B25J 9/161* (2013.01); *B25J 9/163* (2013.01); *B25J 9/1666* (2013.01); *G06F 18/23* (2023.01)

(58) Field of Classification Search
CPC ....... G01C 21/12; B25J 13/087; B25J 9/1697; G05D 1/0238; G05D 2201/0207; G05D 2201/0044; G05D 2201/0016
See application file for complete search history.

(56) References Cited

U.S. PATENT DOCUMENTS

| | | | |
|---|---|---|---|
| 11,553,969 B1* | 1/2023 | Lang | G06T 7/0012 |
| 11,555,903 B1* | 1/2023 | Kroeger | G01S 17/89 |
| 2021/0356572 A1* | 11/2021 | Kadambi | G01B 11/24 |
| 2022/0187841 A1* | 6/2022 | Ebrahimi Afrouzi | G05D 1/0242 |
| 2023/0114137 A1* | 4/2023 | Wu | A61B 46/10 606/130 |
| 2023/0131458 A1* | 4/2023 | Isonni | B25J 9/1653 700/245 |

OTHER PUBLICATIONS

Oridate, "Velocity-Based Robot Motion Planner for Under-Constrained Trajectories with Part-Specific Geometric Variances", The University of Texas, Dec. 2021, 178 pages.

* cited by examiner

*Primary Examiner* — Dalena Tran
(74) *Attorney, Agent, or Firm* — Kilpatrick Townsend & Stockton LLP

(57) ABSTRACT

Aspects of the disclosure are directed towards path generation. A method includes a device registering working frame of a target object with a reference frame of a robot. The device can generate a path over a representation of a surface of the target object. The device can generate a trajectory over the surface of the target object based on the registration, the path, and a normal. The device can classify a target type for the real-world target using a machine learning model based on scanned data of the surface of the target object. The device can generate a robot job file, wherein the robot job file comprises the trajectory and an autonomous operation instruction. The device can transmit the robot job file to a robot controller.

20 Claims, 13 Drawing Sheets

PART MODELING FOR PATH GENERATION TO GUIDE ROBOTIC END EFFECTOR

CROSS-REFERENCES TO RELATED APPLICATIONS

This application claims priority under 35 U.S.C. § 119(e) to U.S. Provisional Application No. 63/396,938, filed Aug. 10, 2022, U.S. Provisional Application No. 63/398,202, filed on Aug. 15, 2022, U.S. Provisional Application No. 63/398,203, filed on Aug. 15, 2022, U.S. Provisional Application No. 63/377,149, filed on Sep. 26, 2022, U.S. Provisional Application No. 63/481,563, filed on Jan. 25, 2023, and U.S. Provisional Application No. 63/481,576, filed on Jan. 25, 2023, the contents of which is are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of the enterprise's workers.

BRIEF DESCRIPTION OF THE DRAWINGS

Various embodiments in accordance with the present disclosure will be described with reference to the drawings in which.

DETAILED DESCRIPTION

Figure 1:
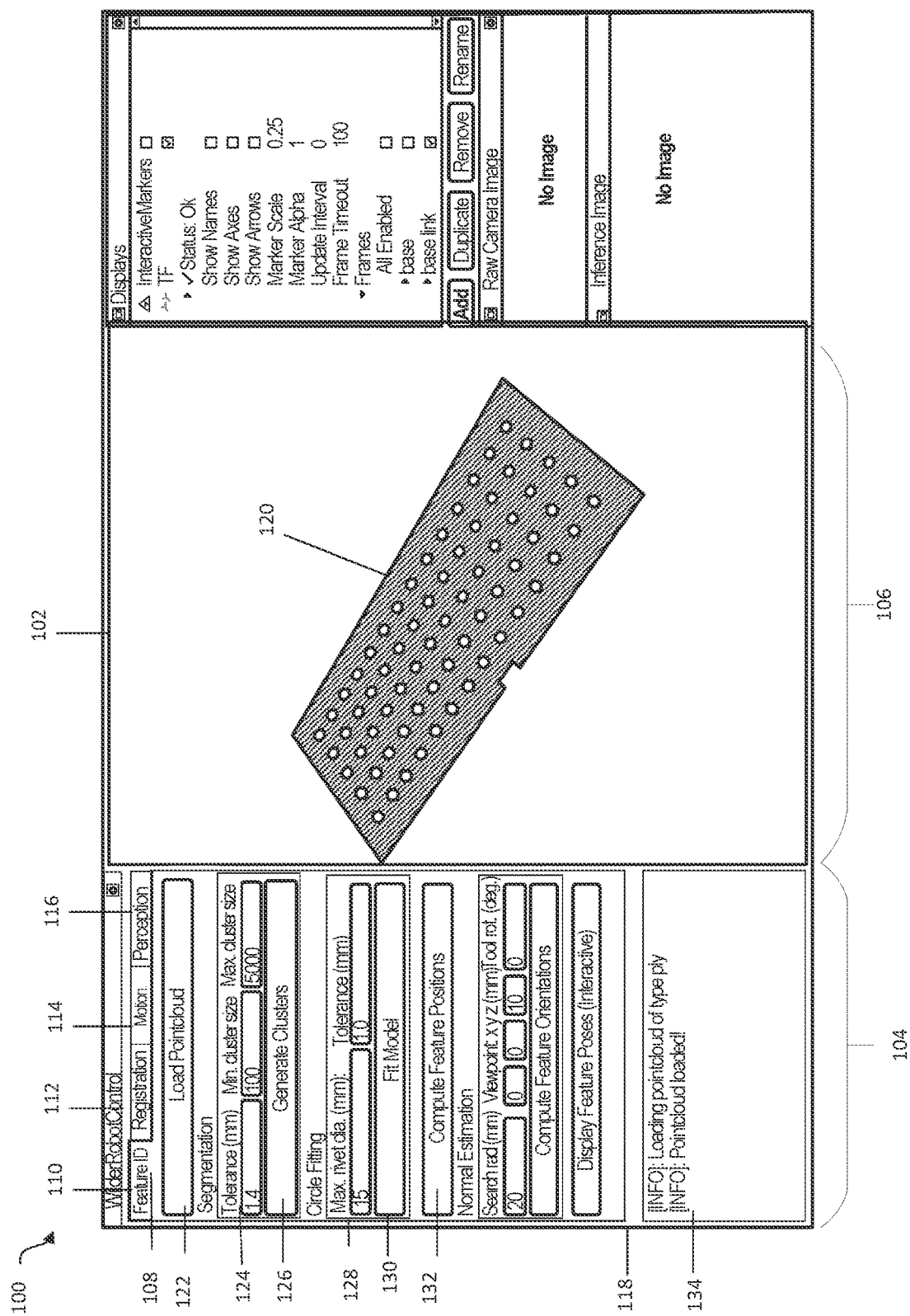
FIG. 1 is an illustration of a user interface (UI) for guiding a robot, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Aircraft fasteners are mechanical devices that are used to assemble two or more aircraft parts into assemblies that form the aircraft. Engineers consider various factors, such as shear stress and aircraft load, when considering a type of fastener and the number of fasteners for each assembly. A fastener can vary from another fastener based on diameter, material, and shape. The fasteners are inserted into holes that are arranged through the aircraft parts. A single wing can include thousands of holes, and an entire aircraft can include hundreds of thousands of holes. As aircraft age or incur damage, the aircraft's damaged or worn part needs to be removed and replaced with new parts. In some instances, these aircraft fasteners are removed from the worn or damaged aircraft parts using a drilling tool.

A drilling tool is selected based on the fastener type, and the drill's trajectory can be based on the orientation of the fastener and hole with respect to the aircraft part. If an incorrect drill is selected or drill is not inserted correctly into the fastener, the fastener may not be removed, and the aircraft part can be damaged. One issue related to fastener removal is that the fasteners are not uniformly arranged over different aircraft, even the same model aircraft. A first aircraft part can be mounted on an aircraft through a first set of fasteners. The same aircraft part type can be mounted on another aircraft that is the same model aircraft, but through a second set of fasteners that are oriented differently on the aircraft part than the first set of fasteners. The individualized arrangement of fasteners for each aircraft part is amplified by the fact that some aircraft parts include multiple types of fasteners. Therefore, when inserting a bit into a fastener, the individual orientation and type of fastener has to be considered to properly remove a fastener. This issue is compounded with the inability to use the orientation of a set of fasteners in one aircraft part as a template for another set of fasteners in a similar aircraft part. This can be an issue for designing an automated system for aircraft fastener removal as the system needs to generate a path and trajectory to reach each fastener on an individual basis for proper aircraft fastener removal.

Embodiments described herein addressed the above-referenced issues via a system that can guide a robot through dynamic path planning, and trajectory planning. A user can use a user interface (UI), to direct the robot to receive point cloud data that represents a target object. The point cloud data can be segmented to associate point cloud data points to different objects in the point cloud data. The system can extract features from the segmented objects to identify a target object, such as an aircraft panel. The system can further identify real-world targets within the target object, such as holes or fastener heads. The user can further use the UI to direct the system to estimate the target's three dimensional position in space and calculate a normal extending away from the surface of the target. The system can use the three-dimensional position and the normal to guide an end effector, such as a drill into the real-world target. The user can further use the UI for registration to obtain a transformation matrix for transforming a working frame of a target object to a reference frame of the robot. The user can further use the UI to direct the system to generate a set of virtual points and calculate a path using the virtual points over the surface of the target object. Based on the computed path, the user can use the UI to direct the system to compute a trajectory to traverse the computed path. The trajectory can include a set of movements for each joint of the robot to traverse the path while avoiding collisions and accounting for the limitations of the robot.

The embodiments described below are described with reference to fastener removal. It should be appreciated that the functionality described herein can be applied to various applications that involve a robot with an end effector that traverses the surface of a target object using a generated trajectory, such as decontamination, painting, washing, and drilling.

FIG. 1 is a user interface (UI) 100 of an application for guiding a robot, in accordance with one or more embodiments. The UI 100 is a point of interaction between a user and computing elements of a system. The computing elements can be a collection of hardware elements, such as a user computing device and/or a bare metal server, and software elements, such as an application, for path generation, trajectory generation, and guiding a robot. The UI 100 can be a collection of interface elements that include input controls (e.g., buttons, text fields, checkboxes, dropdown lists), navigational components (e.g., sliders, search fields, tags, icons), informational components, (progress bar, notifications, messages boxes), and containers (e.g., accordions). As illustrated, the UI 100 is a multi-panel UI, where multiple pages can be contained within a single window 102. Each page can be accessed through a respective page tab. The UI 100 can include an action pane 104 that includes a collection of input controls, navigational components, and informational components. The UI 100 can further include a visualization pane 106 for providing a visualization of, for example, a point cloud segmentation, path generation, and trajectory generation. The action pane 104 can be adjacent to the visualization pane 106 and both can be displayed on the single window 102. The UI can include one more additional pane, such as a display selection pane described below.

The action pane 104 can include a navigation pane 108, which includes tabs for navigating to respective pages of the UI 100. As illustrated, the UI 100 can include a feature identification (Features ID) tab 110 for navigating to a feature identification page, a registration tab 112 for navigating to a registration page, a motion plan tab 114 for navigating to a motion plan page, and a perception tab 116 for navigating to a perception page.

In FIG. 1, a user has selected the feature identification tab 110, and therefore, the feature identification page is displayed. A user can use the feature identification page 118 to select input controls for segmenting a point cloud, associating point cloud data to objects included in a target object, and computing a normal to and/or from the surface of the target object. The user can store a three-dimensional representation (e.g., a point cloud or computer-aided design (CAD) file) of a target object in a computing system to be later displayed as visualization 120. The user can click on a Load Pointcloud button 122 and access a file system of a computing system. In response to receiving a selection of the Load Pointcloud button 122, the UI 100 can display the filesystem (e.g., files and folders), and the user can select the three-dimensional representation to retrieve for the application.

The application can retrieve the three-dimensional representation, which can be displayed as a visualization 120 on the visualization pane 106. As illustrated, point cloud data represented as a visualization 120 is displayed on the visualization pane 106. In this instance, the visualization 120 is of a real-world panel with an array of holes. In practical applications, the visualization 120 can be of any real-world part or assembly (aircraft component, vehicle component, structure component). In other instances, the visualization 120 can be any object upon which a path and a trajectory is to be generated. The visualization 120 can be a three-dimensional representation that can be manipulated by the user through the UI 100. The user can manipulate the visualization to change the position to the visualization 120. For example, the user can use a peripheral device, such as a keyboard to enter commands or a mouse to click a cursor on the visualization plane 106, to rotate, flip, zoom in or zoom out the visualization 120. In response to the input signal from the peripheral device, the UI 100 can alter the three-dimensional position and the orientation of the visualization 120.

The user can further use the UI 100 to engage in a segmentation process for associating point cloud data points to objects in the visualization 120. The UI 100 can include a first set of fields 124 for inputting segmentation parameters. A user can manually select a field and type in a target value for a parameter. The segmentation parameters can include tolerance, which can include a maximum distance between point cloud data points to be considered part of a cluster. The segmentation parameters can include a minimum size, which can be the minimum number of data points needed to form a cluster. The segmentation parameters can further include a maximum cluster size, which can be the maximum number of data points needed to form a cluster. In some instances, certain objects can have an estimated number of data points. Therefore, the user can use the segmentation parameters to select a minimum cluster size below the estimated cluster size and select a maximum cluster size to be above estimated cluster size. In this sense, the user can use the UI 100 to filter out objects that have an estimated number of data points below the minimum cluster size and objects that have an estimated number of data points above the maximum cluster size. The user can then click a Generate Clusters button 126 to initiate a segmentation phase. The application can receive each of the user defined parameter values in response to a single click of the Generate Clusters button 126 and segment the three-dimensional representation accordingly. The segmentation phase can include executing a distance measuring function (e.g., Euclidean distance function) from a library and determining a distance between the data points. The application can select data points that are within a threshold distance of each other to be considered a cluster. The segmentation phase can further include identifying clusters based on a minimum cluster size and a maximum cluster size. As used herein an identified cluster can be considered an object. For example, as seen in FIG. 1, the objects can include the holes or the sides of the visualization 120.

The UI 100 can further permit the user to follow the segmentation phase with an identification phase, in which the application can determine whether an identified cluster corresponds to a real-world target (e.g., hole, fastener). The UI 100 can include an input control button for executing an object recognition model. The model can be a rules-based model or a machine learning model. The model can further be configured to extract features from the clusters as inputs and predict a class for each cluster. As indicated above, the herein embodiments are illustrated with respect real-world targets that are holes or fasteners. Therefore, the model can be a circle fitting model configured to fit circles to the identified clusters. The feature identification page 118 of the UI 100 can include a second set of fields 128 for inputting model parameters. The fields can include, for example, a maximum diameter field and a tolerance field. A user can enter target values for each field of the second set of fields.

For example, the user can select a value for the maximum diameter size of a cluster to be considered a hole or fastener. The feature identification page 118 can further include a Fit Model button 130 for initiating the model fitting. In response to receiving an input signal from the Fit Model button 130, the application can initiate the object recognition model (e.g., circle fitting algorithm). The object recognition model can receive the clusters and user-based parameters from the second set of fields as inputs, and fit a predefined model (e.g., a circle) to the clusters. The clusters that fit the model and are within the user-based parameters of the second set of fields 128 are considered to be real-world targets. The application can alter the visualization 120 (e.g., change color, change texture, add three-dimensional structure, or otherwise visually mark) of the clusters that correspond to real-world targets in the visualization pane 106. Therefore, a user viewing the visualization 120 can visually identify the targets (e.g., real world targets).

The feature identification page 118 can further permit the user to initiate identification of a relative position of each target on the visualization 120. The feature identification page 118 can include a Compute Feature Positions button 132 for initiating the application to execute an algorithm to determine the relative position of each target. It should be appreciated that the input control button names and functions are not limiting. Each of the UI 100 elements can perform the general functions described, notwithstanding the name. For example, the Load Pointcloud button 122 allows the user to select a point cloud to retrieve for the application. If the application was tasked with locating targets in a different three-dimensional representation such as computer-aided design (CAD), the UI 100 could include a Load CAD button. Once the application computes the relative positions of the targets, the UI 100 can permit a user to calculate the respective normal for each cluster that corresponds to a real-world target. The calculation and visualization of the normal is described with respect to FIG. 2. The action pane 104 can further include a log window 134 for displaying a log of the actions executed by the application.

Figure 2:
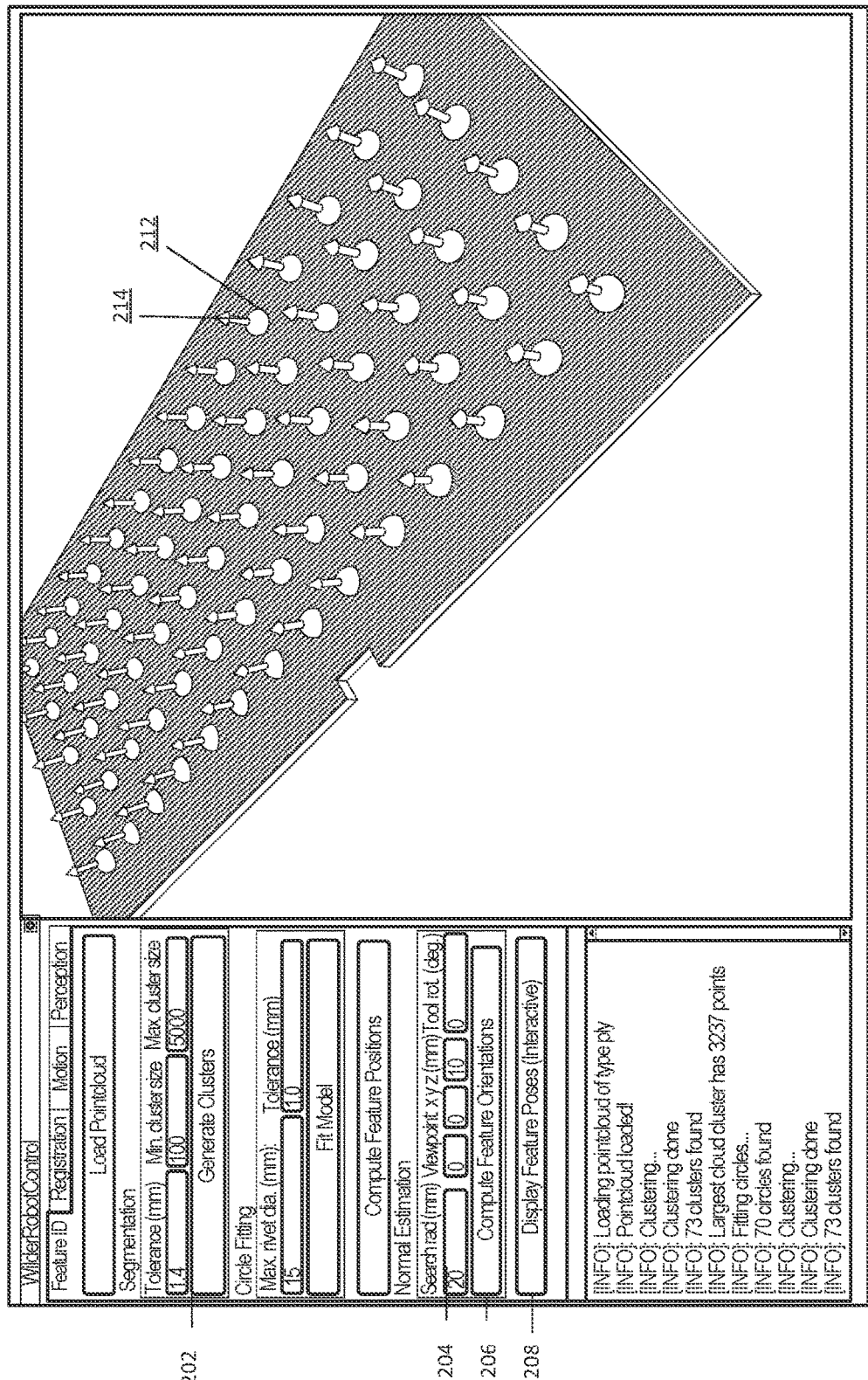
FIG. 2 is an illustration of a UI for guiding a robot, in accordance with one or more embodiments.

FIG. 2 is an illustration of a UI 200 for guiding a robot, in accordance with one or more embodiments. For purposes of illustration, only the action pane and a visualization pane of the UI 200 are illustrated. The feature identification page 202 of the UI 200 can include a third set of fields 204 for inputting parameters for calculating a respective normal. The normal is a line that is orthogonal to a surface of a cluster that corresponds to a real-world target. The normal can be used to guide a robotic end effector, such as a drill, into or away from the target. The third set of fields 204 can include, for example, a search radius field, an x, y, and z viewpoint field, and a tool rotation field. A user can enter target values into each field of the third set of fields 204 through the UI 100. The feature identification page 202 can include a Compute Feature Orientations button 206. The user can click the Compute Feature Orientations button 206 and the application can initiate a normal calculation phase in response. The feature identification page 202 can further include a pose estimate phase to define a set of waypoints (e.g., virtual points) on the surface of the target object. The waypoints can correspond to each cluster that corresponds to a real-world target (e.g., hole, fastener, or location to drill a hole), and a number of waypoints can be greater than the number of objects, or less than the number of clusters that corresponds to a real-world target. The application can assume no coplanar waypoints and calculate a normal for each cluster that corresponds to a real-world target. The orientation of each normal to the surface of the target object can be based on the objects identified in the point cloud data. Therefore, one normal can be perfectly orthogonal to the surface of the target object, whereas an adjacent normal can be slightly tilted and not orthogonal to the surface. As indicated above, holes can be drilled, and fasteners inserted manually. Therefore, the direction of the hole or fastener into the target object may be oriented differently to the target object. Therefore, a single click of the Compute Feature Orientations button 206 can initiate a normal calculation phase with respect to each waypoint for proper normal calculation.

The application can further specify a viewpoint or specify whether the normal is calculated with a direction toward the target or a direction away from the target. This can be calculated based on the user-defined parameters inputted into the third set of fields 204. The application can further specify an orientation of the cluster that corresponds to a real-world target. The robot end effector's motion could have more degrees of freedom than the degrees sufficient to locate the targets in three-dimensional space. Therefore, to calculate the movements of the robotic arm and end effector in three-dimensional space, it can be essential to consider the orientation of the targets to properly approach and recede from a real-world target.

The UI 200 can further provide a visualization of the calculated normals on the visualization pane 210. The feature identification page 202 includes a Display Feature Poses button 208 (e.g., input control button). The user can click the Display Feature Poses button 208 and in response, the application can display the calculated normals on a visualization pane 210. A respective waypoint 212 located at a target of an array of clusters that corresponds to a real-world target is illustrated in the visualization pane 210 of the UI 200. The waypoint is a virtual point, where a number of waypoints can be less than a number of targets, greater than a number of targets or the same as a number of targets. The waypoint 212 includes a normal 214 with a directional arrow indicating that the normal 214 is extending away from the waypoint 212. As illustrated, each cluster that corresponds to a real-world target includes a normal extending away from waypoint 216 at a target. This visualization pane feature permits the user to verify whether the calculated normal properly extends either towards or away from each target prior to initiating an actual robot.

Figure 3:
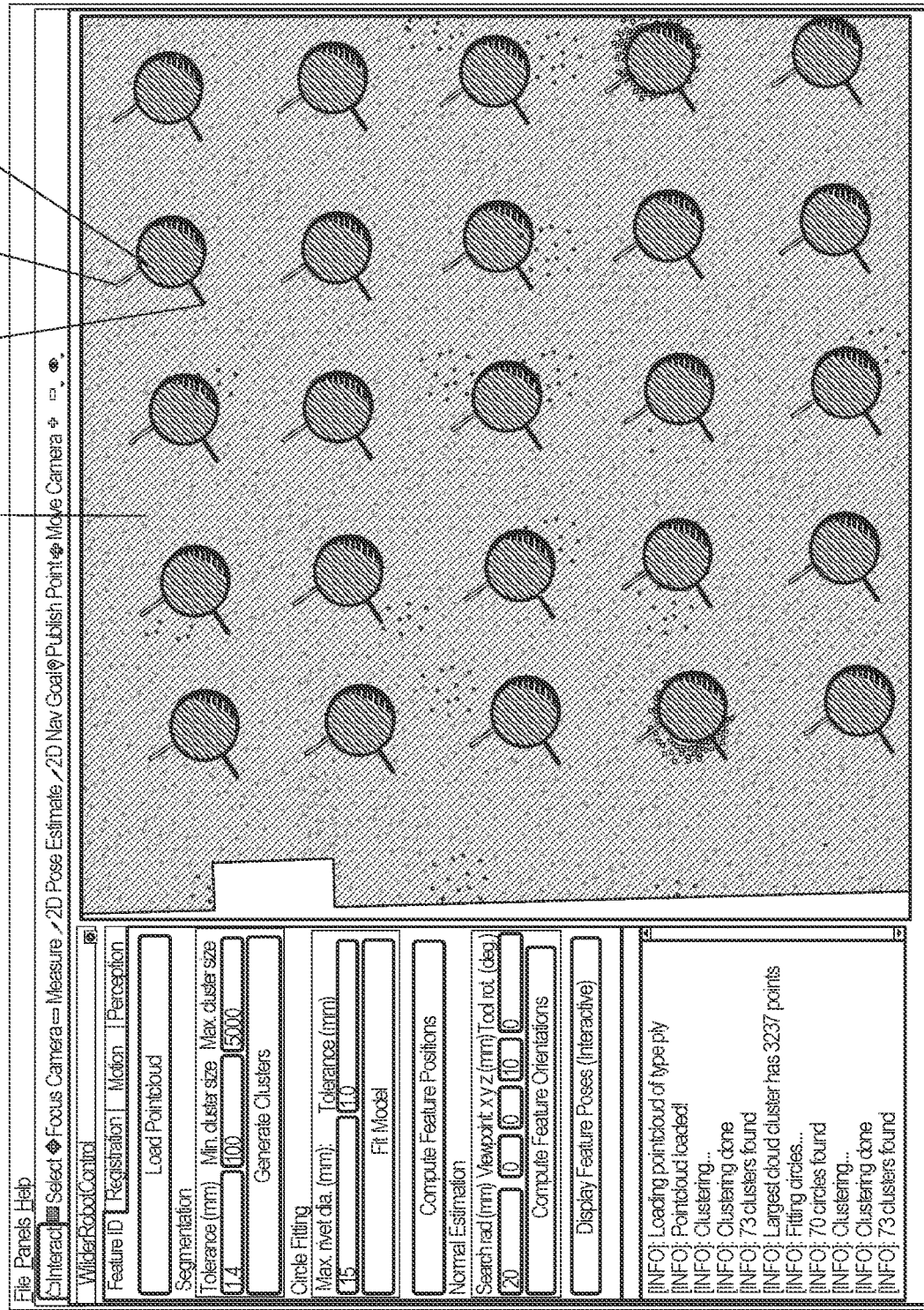
FIG. 3 is an illustration of a UI for guiding a robot, in accordance with one or more embodiments.

In addition to providing a visualization of the normal, which can be considered a z-direction vector, the UI can provide an x-direction vector and a y-direction vector. FIG. 3 is an illustration of a UI 300 of an application for guiding a robot, according to one or more embodiments. For purposes of illustration, only the action pane and a visualization pane of the UI 300 are illustrated. A visualization pane 302 of the UI 300 can display a visualization 304, including an array of targets. A cluster that corresponds to a real-world target 306 (e.g., hole, fastener, location to drill a hole) can include an x-direction vector visualization 308 and a y-direction vector visualization 310. The x-direction vector visualization 308 can be perpendicular to the y-direction vector visualization 310. The x-direction vector visualization 308 and the y-direction vector visualization 310 can be perpendicular to a normal. These vector visualizations can permit the user to verify whether an orientation of the real-world object to the robotic end effector is correct prior to initiating the robot.

Figure 4:
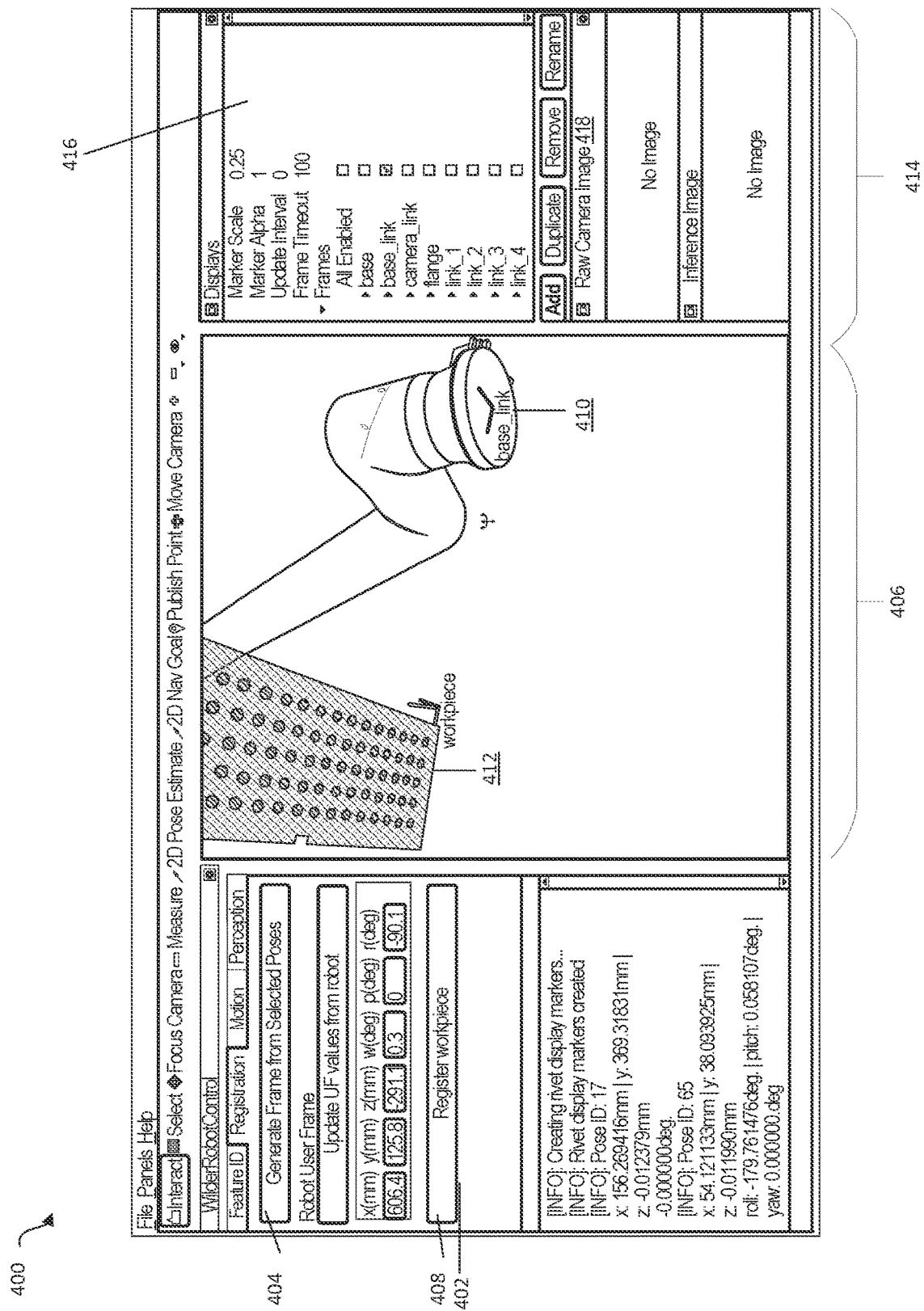
FIG. 4 is an illustration of a UI for guiding a robot, in accordance with one or more embodiments.

FIG. 4 is an illustration of a UI 400 for guiding a robot, in accordance with one or more embodiments. FIG. 4 illustrates a registration page 402 of the UI 400. A user can access the registration page 402 by moving a cursor to a navigation pane and clicking a registration tab. The registration page 402 can initially be arranged underneath another page(s) (e.g., a feature identification page). A user can click on the registration tab and cause the UI 400 to display the registration page 402 over the other page(s). The user can use the registration page 402 to cause the application to execute a registration phase. During the registration phase, the application can localize the position and orientation of the real-world object to the robot. In particular, the registration phase can calculate a transfer function for transforming a working frame (e.g., coordinate system of target object) to a reference frame (coordinate system of the base of the robot). The registration page can include a Generate Frame from Selected Poses button 404. The Generate Frame from Selected Poses button 404 can be for initiating the application to calculate a reference frame for the real-world object. In the real world, the target object can be oriented in three-dimensional space. For example, if the real-world object is an aircraft panel, the panel can be arranged on the fuselage, wing, or other position on the aircraft. Therefore, the UI 400 can provide the user with the UI elements to calculate a reference frame for the real-world object to be used to calculate the transfer function.

The application can use various methods to generate the working frame. The application can use, for example, a common points method or a fiducial marker method. For example, the user can use the UI 400 to select multiple clusters representing real-world targets (e.g., three targets). The UI 400 can further display visual markers for the targets on a visualization pane 406 of the UI 400. For example, each of the selected clusters that correspond to a real-world target can be displayed in a unique color that is different from each other target. The user can move the end effector of the robot to each of the targets (e.g., holes, fasteners/locations to drill a hole), to orient the tool center point (TCP) of the end effector to each of the targets. The application can then calculate measurements of a distance to the target object to be used to calculate the transfer function. The application can further use the transfer function for transforming a working frame of a target object to a reference frame of the robot.

The registration page 402 can further include a Register workpiece button 408 for initiating the application to calculate a transfer function between a reference frame of a robot and the real-world object. The UI 400 can further display the reference frame of the robot 410 and the real-word object 412. The display presented on the visualization pane 406 can be user defined by interaction with a display selection pane 414. The display selection pane 414 can include a window 416 that can include a collection of elements that a user can select. If the elements are too numerous to be displayed together, the window 416 can include functionality to scroll up and down to view each of the elements. As seen, the user has selected the base link frame, which is displayed on the visualization pane 406. This UI functionality can provide assurance to the user that the transfer function relates to the correct reference objects. The display selection pane 414 can further include a raw camera image window 418 for presenting video. For example, if the robot included an image capturing device, the raw camera image window 418 could display a real-time streaming of images captured by the device.

Figure 5:
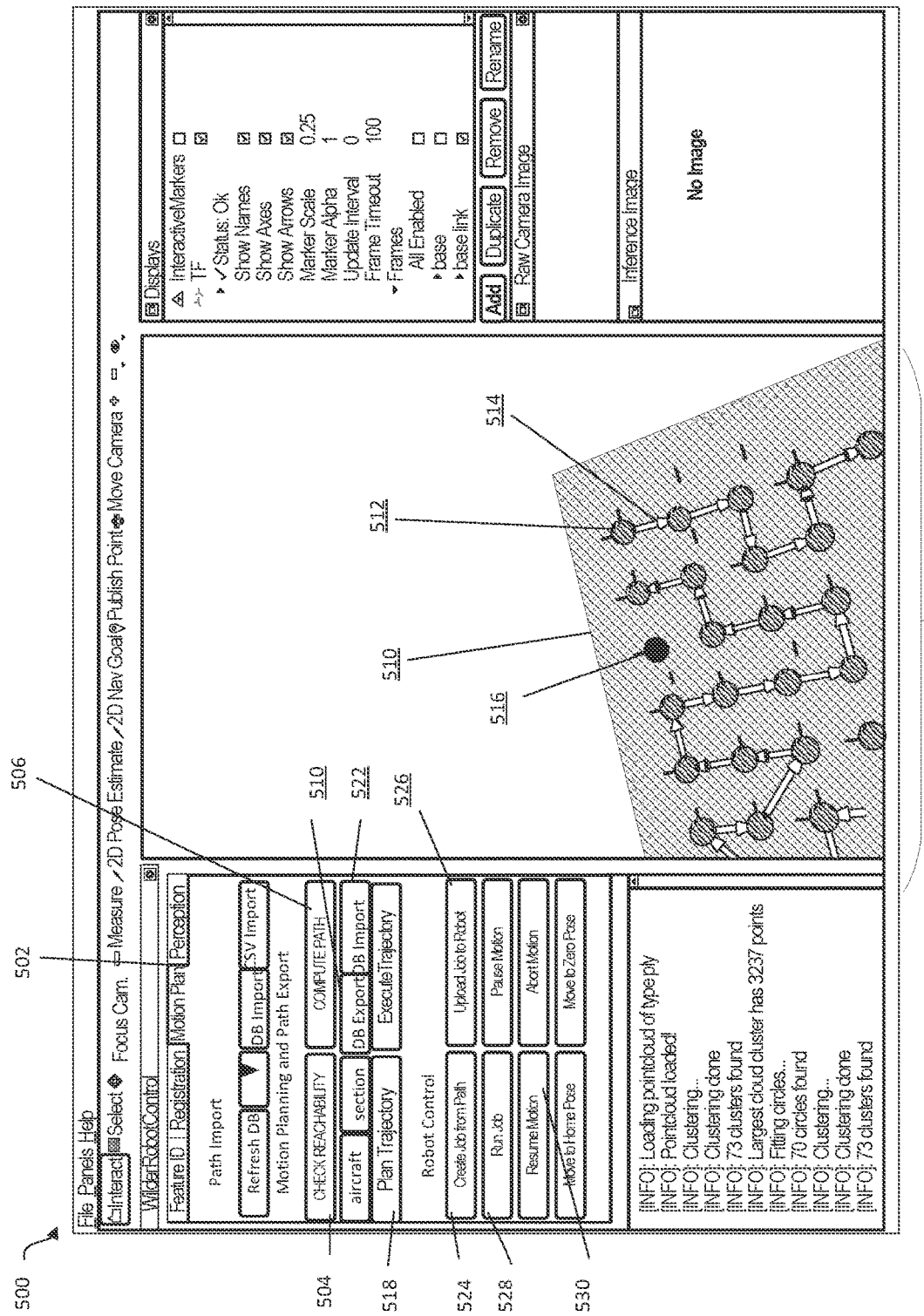
FIG. 5 is an illustration of a UI for guiding a robot, in accordance with one or more embodiments.

FIG. 5 is an illustration of a UI 500 for guiding a robot, in accordance with one or more embodiments. FIG. 5 illustrates a path page 502 of the UI 500. A user can access the motion plan page 502 by moving a cursor to a navigation pane and clicking a motion plan tab. The motion plan page 502 can initially be arranged underneath another page(s) (e.g., a feature identification page and registration page). A user can click on the motion plan tab and cause the UI 500 to display the registration page 502 over the other page(s).

The motion plan page 502 can include a Check Reachability button 504 for initiating the application to determine whether each target is reachable. The user can click the Check Reachability button 504 and in response, the application can determine the reachability of each target. The Check Reachability button 504 can cause the application to reconcile the dimensions of the robot in relation to the dimensions of a real-world object, and retrieve data related to potential collisions between the robot and the real-world target object. For example, the Check Reachability button 504 can cause the application to retrieve data related to expected collisions between the robot and the real-world target object. The application can further determine whether the robot is likely to collide with another object based on the data.

The motion plan page 502 can further include a Compute Path button 506 for computing a path over the target. The path can be a sequence of directions to traverse the targets on the real-world object. A visualization pane 508 can display a visualization 510 of the real-world target object. The visualization 510 can include an initial target 512 that represents a first target to be traversed over the path. The visualization 510 can further include directional markers 514 that display a direction from one target to another target over the path. In this sense, the user can visually inspect the path prior to initiating a robot. If the user wishes to modify the path, the user can do so through the UI 500. The user can engage the UI 500, for example, through a peripheral device and modify one or more targets (e.g., move a visualization of a target in three-dimensional space, delete a waypoint). As illustrated, a waypoint has been removed, and the visualization pane 508 can display an absence 516 of the target. In response to the modification of a waypoint via the UI 500, the application can recalculate the path. As seen in FIG. 5, the waypoint has been removed, and no directional marker 514 is directed in toward the absence 516 of the waypoint.

The motion plan page 502 can further include a Plan Trajectory button 518 for initiating the application to generate a trajectory. The path can include a sequence of movements over the surface of the real-world object that do not consider the individual movements of the robot components. The trajectory can include a sequence of movements that include the movements of the robot components (e.g., motions of the joints of a robotic arm). The user can click the Plan Trajectory button 518, and in response, the application can calculate a trajectory for the robot. For example, the application can employ an inverse kinematics function to calculate movements for each component of a robot (e.g., an upper arm, an elbow, a lower arm, a wrist, and an end effector of the robot).

The motion plan page 502 can further include a DB Export button 518 for exporting the path and trajectory to a database. The path and trajectory can identify a type of robot, the real-world object. For example, if the real-world object is a wing of an aircraft, the path and trajectory can further identify the individual aircraft (e.g., using an identifier, such as a tail number) that includes the wing. In this sense, the path and trajectory can be stored in the database for future use. Therefore, if an aircraft needs to be re-serviced, the individualized path and trajectory for the aircraft can be retrieved. The motion plan page 502 can further include an DB import button 522. The user can click the Import Path from Database button 522 and initiate the application to retrieve a previously stored path and trajectory from the database for the robot to execute. The motion plan page 502 can further include a Create Job from Path button 524 for initiating the application to create a robot job, where the robot job can be a file having one or more portions configured to be executable by the robot. The user can click the Create Job from Path button and in response, the application can configure a file based on the path and trajectory to be executable by the robot. The motion plan page 502 can further include an Upload Job to Robot button 526 for uploading the robot job to a controller of the robot. The user can click the Upload Job to Robot button 526, and in response, the application can upload the robot job to a robot controller. The motion plan page 502 can include a Run Job button 528 for initiating the robot to execute the robot job. The user can click the Run Job button 528 and in response, the application can cause the robot to execute the robot job.

The motion plan page 502 can further include various input control buttons 530 for controlling the robot in real-time. The input control buttons can include a Move to Home Pose button, Move to Zero Pose button, Pause Motion button, Resume Motion button, and an Abort Motion task button. The user can click any of these buttons, and in response, the application can initiate a responsive motion by the robot. For example, if the user clicks the Pause Motion button, the robot can responsively pause its motion.

Figure 6:
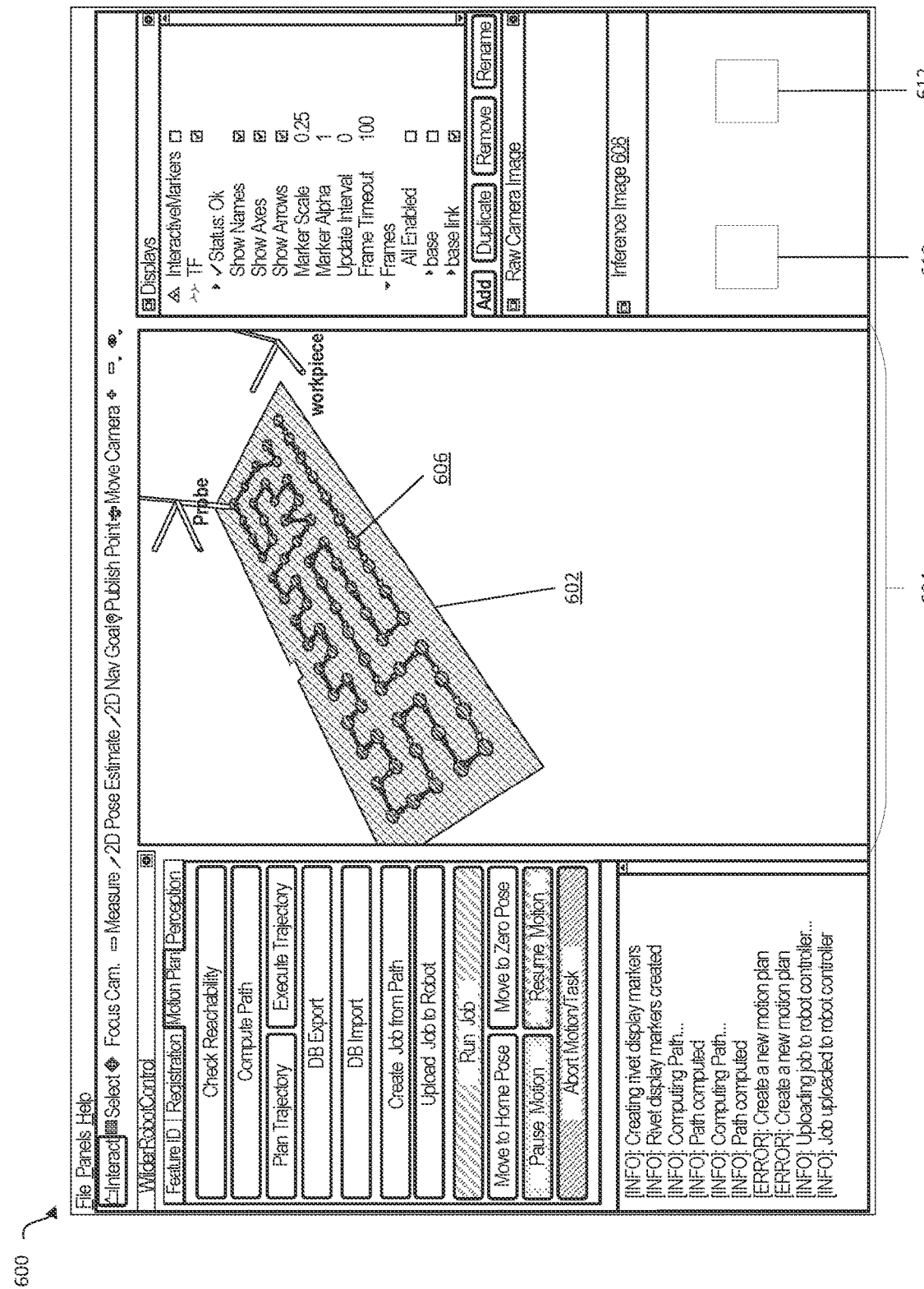
FIG. 6 is an illustration of a UI for guiding a robot, in accordance with one or more embodiments.

FIG. 6 is an illustration of a UI 600 for guiding a robot, in accordance with one or more embodiments. As illustrated a visualization 602 displayed on a visualization pane 604. The visualization 602 displays a path 606 for traversing targets on the real-world object. The UI 600 can further include an inference image window 608 which can display in real-time, a visual marker for each time that the robot detects a target. As illustrated, a first visual marker 610 is displayed next to a second visual marker 612. In practice a robot can be traversing the real-world object using the calculated trajectory. As the robot end effector passes over and detects a target, the visual marker can appear. Therefore, the first visual marker 610 can appear on the inference image window 608 on the inference image window 608 at a first time, to, as the end effector passes over the first target; and the second visual marker 612 can appear at a second time, ti, as the end effector passes over a second target. Therefore, the user can see in real-time that the robot is detecting the target.

Figure 7:
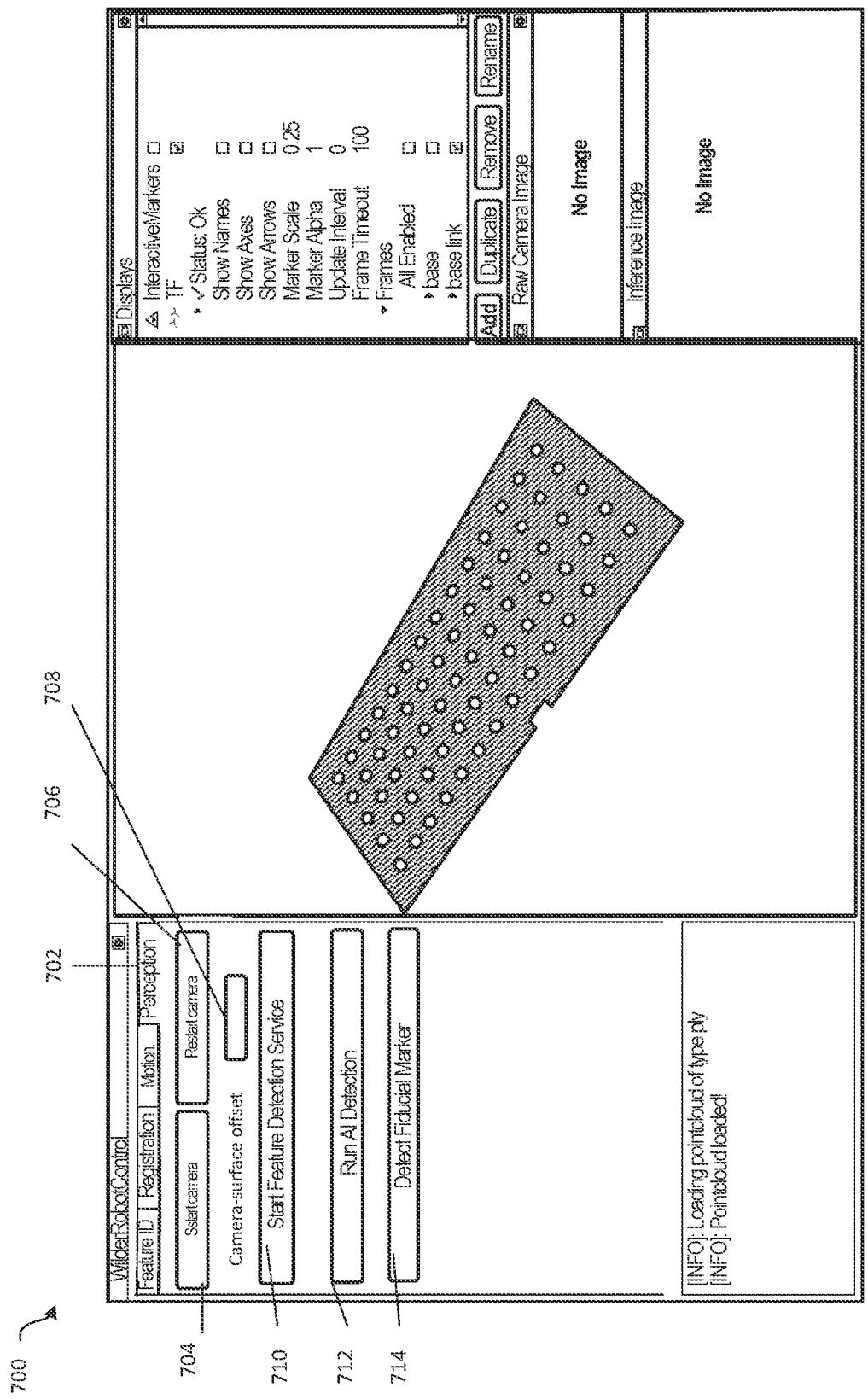
FIG. 7 is an illustration of a UI for guiding a robot, in accordance with one or more embodiments.

FIG. 7 is an illustration of a UI 700 for guiding a robot, in accordance with one or more embodiments. The perception page 702 of the UI 200 can include a start camera button 704 and a restart camera button 706. Additionally, a user can input a camera parameter, such as a camera surface offset 708. The start camera button 704 can be for initiating the camera. The restart camera button can be for restarting a camera. As described above, a display selection pane can further include a raw camera image window for presenting video. For example, if the robot included an image capturing device, the raw camera image window, could display a real-time streaming of images captured by the device. The real time images can correspond to a visualization being displayed on the UI 700. The perception page 702 can further include a start feature detection service button 710. As described above, the application can detect features (e.g., holes or fasteners) on the surface of a target object. The start feature detection service button 710 can initiate a service to detect features on the surface of the target object.

The perception page 702 can further include a run artificial intelligence (AI) detection button 712 for executing the AI feature identification algorithm. The application can receive image data of the target objects. For example, the application can receive captured images from the camera initiated by the start camera button 704. In other embodiments, the application can receive data from other sensors, such as a thermal sensor, or spectral sensor. The application can receive the data and use the data as inputs for a neural network, such as a convolutional neural network (CNN). The neural network can receive the data and predict classes for each target. The perception page can further include a detect fiducial marker button 714. As described above, the application can use various methods to generate the working frame. The application can use, for example, a common points method or a fiducial marker method. The detect fiducial marker button 714 can initialize the application to instruct a robot to detect the fiducial markers.

Figure 8:
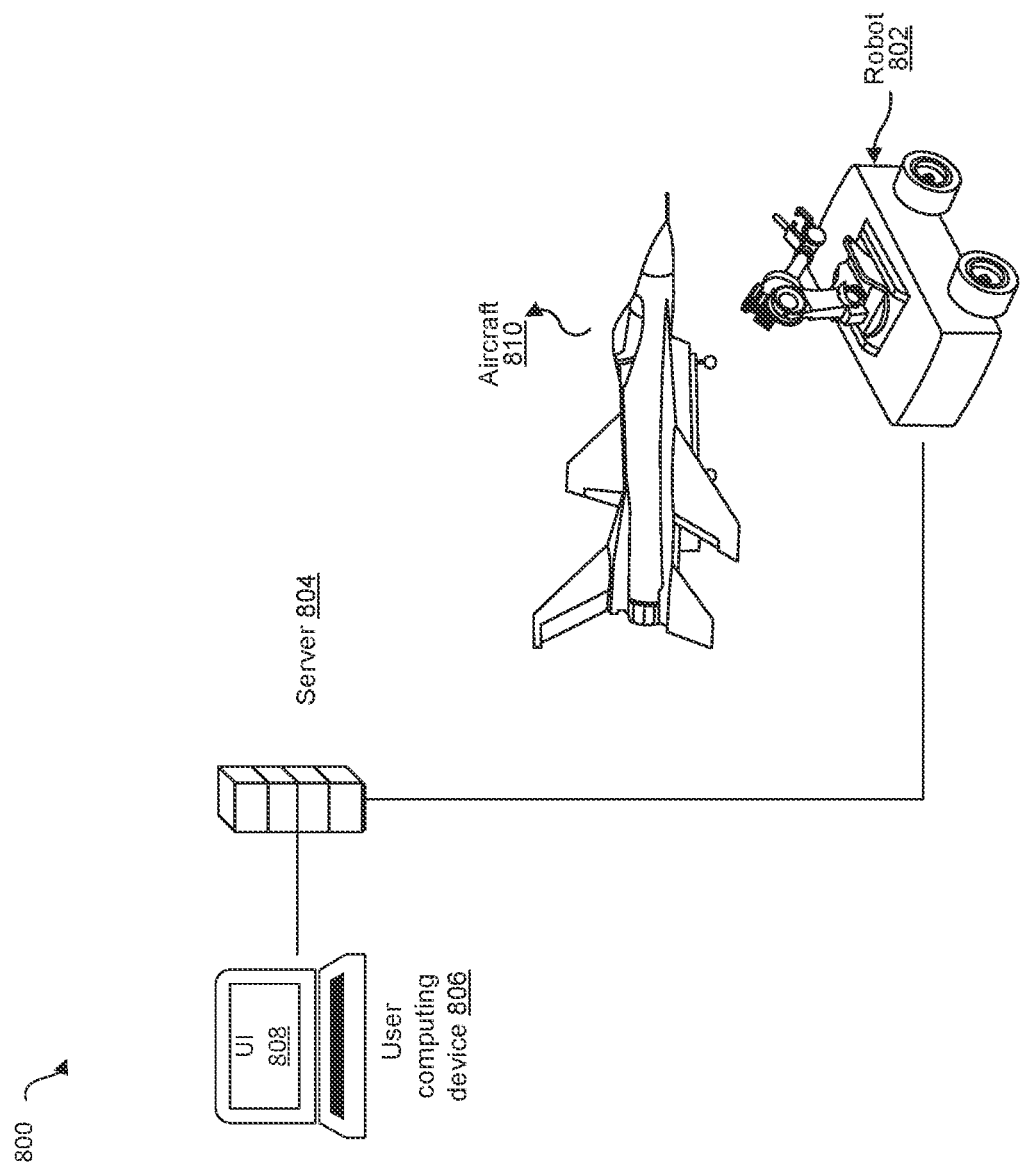
FIG. 8 is an illustration of an environment for using a UI to guide robotic operations, in accordance with one or more embodiments.

FIG. 8 is an illustration 800 of an example of an environment for using a UI to guide robotic operations, in accordance with one or more embodiments. The environment 800 can include a robot 802, a server 804, and user computing device 806 for accessing a UI 808. The robot 802 can be in operable communication with the server 804 that, in turn, can be in operable communication with the user computing device 806. The server 806 can be located at the same premises as the robot 802 or the server 806 can be located remotely from the robot 802. A user can engage with the UI 808 to transmit messages to and from the server 804, which can, in turn, transmit and receive messages to and from the robot 802. The robot 802, the server 804, and the computing device 806 can be configured to permit the robot to perform autonomous operations on an aircraft 810 and or parts thereof (e.g., wings fuselage) or another real-world object. The autonomous operations can include, for example, removing or installing fasteners for the aircraft 810, decontamination of the aircraft 810, and painting the aircraft 810. It should be appreciated that as illustrated the user computing device 806 can communicate with the robot 802 via the server 804. In other embodiments, the user computing device 806 can communicate directly with the robot 804, and further the user computing device 806 performs the below described functionality of the server 804.

The robot 802 can navigate to the operational area and, once thereat, perform a set of operations to register the aircraft 810 (or a part thereof) to then perform another set of operations on the aircraft 810 (and/or the airplane part). Some of these operations can be computationally expensive (e.g., a feature identification phase, registration phase, path and trajectory generation phase), whereas other operations can be less computationally expensive and more latency sensitive (e.g., drilling a fastener hole operation). The computationally expensive operation(s) can be offloaded to the server 804, whereas the remaining operation(s) can be performed locally by the robot 802. Once the different operations are completed, the robot 802 can autonomously return to a parking area or can be summoned to another operational area.

In an example, a robot 802 can include a movable base, a power system, a powertrain system, a navigation system, a sensor system, a robotic arm, an end effector, input and output (I/O) interfaces, and a computer system. The end-effector can support a particular autonomous operation (e.g., drilling) can be a line-replaceable unit with a standard interface, such that the end-effector can be replaced with another one that supports a different autonomous operation (e.g., sealing). The end-effector replacement can be carried by the robot 802 itself or can use a manual process, where an operator can perform the replacement. The I/O interfaces can include a communication interface to communicate with the server 802 and the user computing device 806 based on input selections at the UI 808 for selection of autonomous operations to be performed by the robot 802. The computer system can include one or more processors and one or more memory storing instructions that, upon execution by the one or more processors, configure the robot 802 to perform different operations. The instructions can correspond to program codes for the navigation, controls of the power system, controls of the powertrain system, the collection and processing of sensor data, the controls of the robotic arm, the controls of the end effectors, and/or the communications.

The robot 802 can include light detection and ranging (LiDAR) sensors to emit a pulsed laser towards the aircraft 810. The LiDAR sensors can further be configured to collect reflected signals from the aircraft 810. The LiDAR sensors can determine an angle of reflection of the reflected signal and a time elapse (time-of-flight) between transmitting the signal and receiving a reflected signal to determine a position of a reflection point on the surface of the aircraft 810 relative to the LiDAR sensors. The robot 802 can continuously emit laser pulses and collect reflection signals. The robot 802 can transmit the sensor data to the server 804, which can further generate a point cloud of the aircraft 810. The point cloud can be displayed on the UI 808 through a visualization pane. In other instances, the server 804 can retrieve a stored point cloud of the aircraft 810 from a database.

The server 804 can be a hardware computer system that includes one or more I/O interfaces to communicate with the robot 802 and with the user computing device 806, one or more processors, and one or more memory storing instructions that, upon execution by the one or more processors, configure the server 804 to perform different operations. The instructions can correspond to program codes for the communications and for processes to be executed locally on server 804 for the robot 802 given data sent by the robot 802.

The user computing device 806 can be a hardware computer system that includes one or more I/O interfaces to communicate with the server 804 and with the robot 802. The user computing device can include a display for displaying the UI 808. The user computing device can further include one or more input interfaces (e.g., a mouse, a keyboard, a touch screen) for receiving user inputs into the UI 808.

In response to one or more inputs at the UI 808, multiple operations may be needed to be performed and inter-dependencies between these operations may exist. For instance, to identify fasteners and/or drill fastener holes on an aircraft 810, the robot 802 can detect targets (e.g., holes), register the aircraft 810 so that it can be located in a local coordinate system of the robot 802, control the robotic arm to move to the locations according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end effector). As such, the server 804 can execute processes for the computationally expensive/less frequently performed operations, whereas the robot 802 can locally execute processes for the remaining operations.

In some instances, a user can engage the UI 808 and select one or more inputs for controlling the robot 802. The computing device 806 can receive the inputs and transmit a message including the inputs to the server 804. The server can include an application for performing one or more operations to control the robot 802. The server 804 can receive and transmit messages to and from the robot 802. The messages can include operational instructions generated based on inputs to the UI 808. For the local operations, the robot 802 can execute the corresponding processes locally and can inform the server 804 of the results of these local operations (e.g., that a fastener hole was drilled at a particular location on the aircraft 810). The server 804 can transmit a message to the user computing device 806, where the message can include control instructions for updating a visualization displayed at the UI 808.

Figure 9:
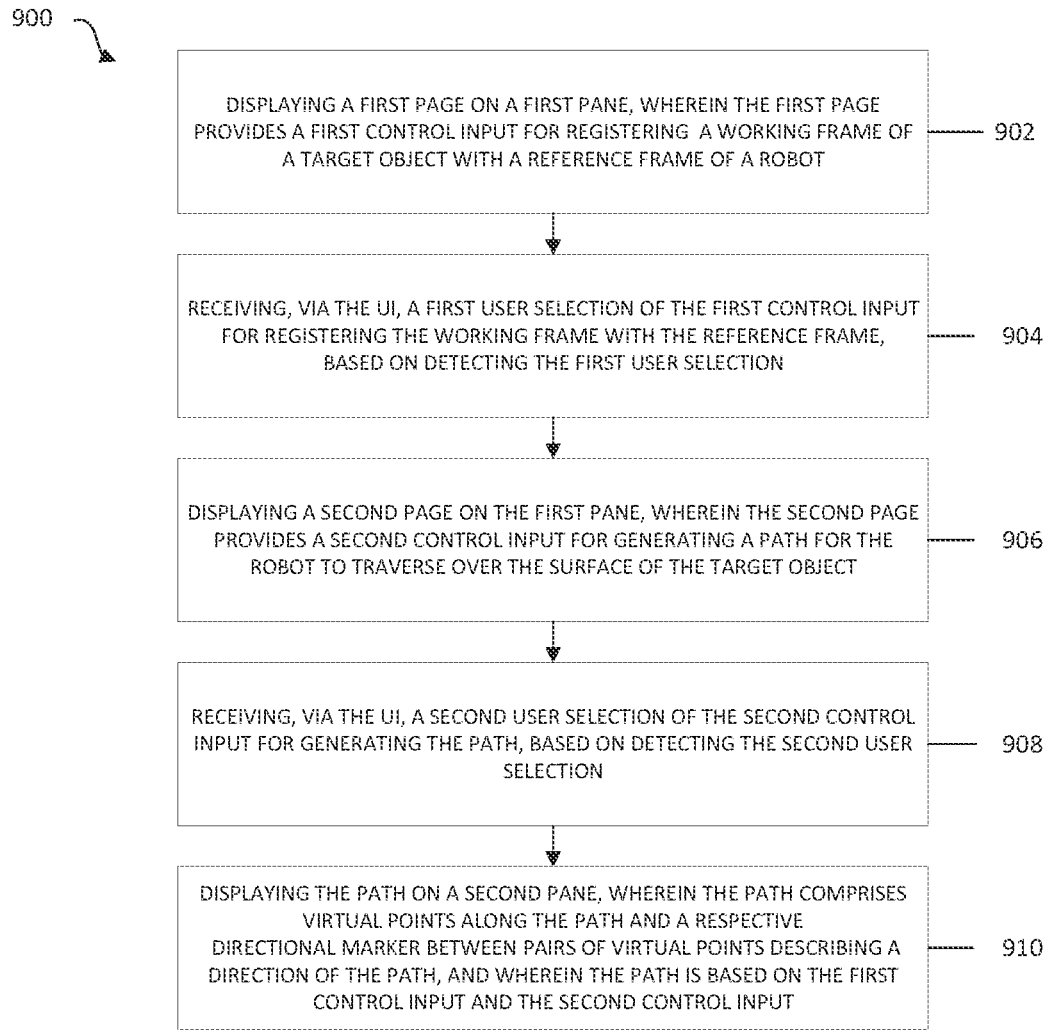
FIG. 9 is a process flow for guiding a robot using a UI, in accordance with one or more embodiments.

FIG. 9 is a process flow 900 for guiding a robot using a UI, in accordance with one or more embodiments. At 902, the method can include a computing device, such as a user computing device, displaying a first page on first pane, wherein the first page provides a first control input for registering a working frame of a target object with a reference from a robot. The UI can be an interface between a user and an application executing on a computing device, such as a server. The first page can be a registration page and registration can include calculating a transfer function to transform the coordinate system of the target object to the coordinate system of the robot. The UI can display a three-dimensional representation of the target object on a second pane, such as a visualization pane. The UI can further include visual markers indicating that the target object is registered, such that the coordinate system of the target object can be transformed into the coordinate system of the robot.

At 904, the method can include receiving, via the UI, a first user selection of the first control input to register the working frame with reference frame, based on detecting the first user selection. A computing device can further receive, via the UI, an indication that the user has selected the control input based on the detections. In some instances, the user can have manually inputted parameter values for registering the target object. In these instances, the computing device can further receive the parameter values based on the detection.

At 906, the method can include the UI displaying a second page on the first pane, wherein the second page can provide a second control input for generating a path for the robot to traverse the surface of a target object. A motion plan page and the path can include a set of generated virtual points and directions reaching each subsequent virtual point to traverse the surface of the target object. The second control input can be, for example, a compute path button that a user can click to generate a path over the surface of the target object.

At 908, the method can include the computing device receiving, via the UI, a second indication of a second user selection of the second control input for generating the path to the computing device. The UI can detect a user selection of the second control input. For example, the UI can detect the user selecting the Compute Path button. Based on the detection, the computing device can receive an indication of the selection to the computing device.

At 910, the method can include the UI displaying the path on a second pane, wherein the path comprises virtual points along the path and a respective directional marker between pairs of virtual points describing a direction of the path. The second pane can be a visualization pane and be adjacent to the first pane.

Figure 10:
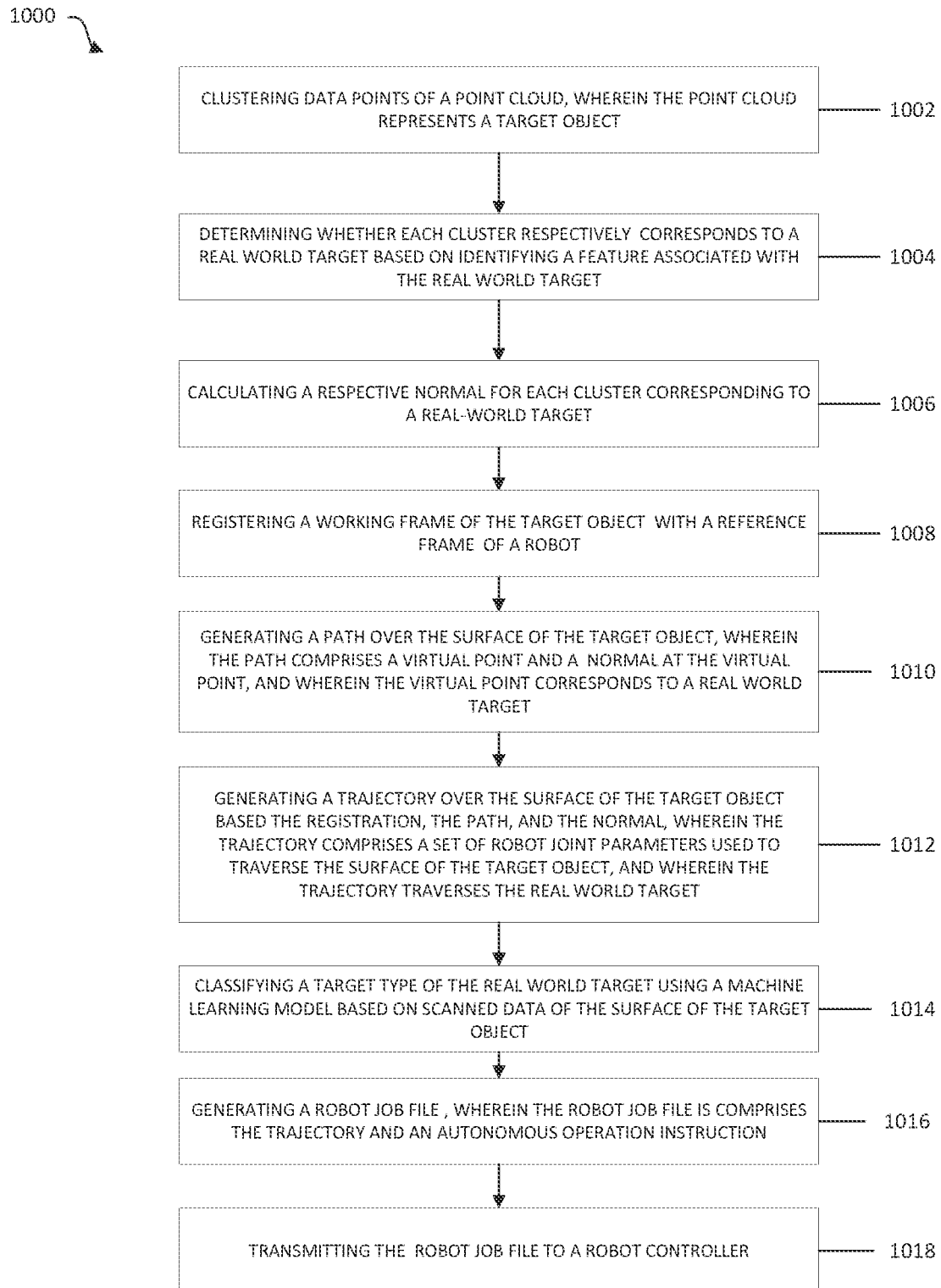
FIG. 10 is a process flow for guiding a robot, in accordance with one or more embodiments.

FIG. 10 is a process flow 1000 for guiding a robot, in accordance with one or more embodiments. At 1002, the method can include a computing device, such as a server or user computing device, clustering points of a point cloud, wherein the point cloud corresponds to a target object. The computing device can receive a point cloud of a target object, such as an aircraft, vehicle, or other structure. In some instances, the computing device can retrieve a point cloud of a target object from a repository based on the specifications of the target object. The computing device can further enter a clustering or segmentation phase and generate clusters or clusters based on a first input. In addition to receiving an indication to generate clusters, the computing device can receive user-defined clustering or segmentation parameters. The user can enter clustering or segmentation parameters into a UI and the UI can transmit the parameters to the computing device. The computing device can translate the indication to generate clusters and the parameters into instructions for clustering data points of the point cloud.

At 1004, the method can include determining whether each cluster or segment represents a real-world target based on identifying a feature corresponding to a real world-target. The feature can be associated with a feature of a real-world object, such as circular patterns for a hole or fastener. The computing device can extract features from each cluster to determine whether the cluster includes a set of desired features. For example, the computing device can determine whether the clusters have a circular shape. The computing device can further identify clusters that include the desired features as targets.

At 1006, the method can include the computing device calculating a normal for each cluster corresponding to a real-world target. The computing device can generate waypoints utilizing a series of algorithms. The waypoints are virtual points located at the targets that can be used to generate a path and trajectory over the surface of the target object. The waypoints can also be used to guide the robot towards or away from a point on the surface of the target object. The number of waypoints can be configured by a user, based on various parameters. For example, the user can select a number of waypoints based on the shape of the surface of the target object, the number of targets, or the size of the target object. The computing device can further calculate the normal extending to or from each waypoint.

At 1008, the method can include the computing device registering a working frame of the target object with a reference frame of the robot. This can include calculating a transfer function for associating a reference frame of the target object to a frame of the base of the robot. In other words, registration can include determining the location of the robot with respect to the target object. In some instances, the user can mark multiple targets on the real-world object and on a computer representation of the object. The user can further direct the robot to each of the targets to determine a positional relation of each marked target object to a tool center point (TCP) of the robot. The robot can transmit the positional relationship data back to the computing device. Based on the positional relationship data, the computing device can calculate a transfer function for modeling a relationship between a position of the robot and a location on the target object in the coordinate system of the robot.

At 1010, the method can include the computing device generating a path over the surface of the target object, wherein the path comprises a set of virtual points and a respective normal at each virtual point, and wherein each virtual point corresponds to a real-world target. The computing device can generate a path over the surface of the target object based on the waypoints. The path can be a collection of three-dimensional movements that traverse the surface of the target object. The path can be robot agnostic and does not necessarily take into consideration the limitations of the robot. The path can cover the entirety of the surface of the target object or a portion of the surface of the target object. While the waypoint generation step creates a waypoint to use as a basis for a path, the waypoints are not ordered to provide an indication of how the path should proceed. One technique to order the waypoints is to minimize a desired parameter such as execution time or path length. The computing device can minimize the path length by taking the waypoint graph as an input into an optimization technique (e.g., a traveling salesman optimization algorithm). The computing device can use the output of the optimization technique to determine the path across the waypoints. In other embodiments, the computing system can employ other optimization techniques, such as graph-based techniques, or other appropriate techniques.

At 1012, the method can include the computing device generating a trajectory over the surface of the target object based on the registration, the path, and each respective normal, wherein the trajectory comprises set of robot joint parameters used to traverse the surface of the target object, and wherein the trajectory traverses the surfaces of the real-world target. The computing device can translate the path into a trajectory for moving the robot in real life. The trajectory can consider, for example, the available motions of the robot, a desired pose of the end effector in relation to the surface of the target object, and avoidance of collisions with the target object. It should be appreciated that as the end effector moves over the surface of the target object, the entire robot may need to move to avoid a collision. The computing device can consider anticipated changes in the relative positions of the target object and the robot in generating the trajectory. In some instances, the computing device may need to repeatedly generate trajectories to reach a location of the target object or avoid collisions.

The computing device can use inverse kinematics to calculate the trajectory. Inverse kinematics is a process that takes the desired pose of the robot arm and determines a position for each of the robot's components (e.g., base, the upper arm, the elbow the lower arm, the wrist, and the end effector). Through inverse kinematics, the computing device can determine a configuration of the components to effectuate the desired pose of the robot. The computing device can apply various approaches for inverse kinematics, such as a closed-form solution approach or an optimization approach. Once the computing device determines the desired position for each of the above-referenced components, the computing device can determine a motion for each of the components to reach the desired position. The robot can be actuated to move about each of its axes to enable multiple degrees of freedom (DoF), and multiple configurations can lead to the desired pose, a phenomenon known as kinematic redundancy. Therefore, the computing device can apply an optimization technique to calculate an optimal motion for each component to reach the desired position.

The computing device can further identify one or more continuous trajectories that are collision free by employing various techniques to avoid collisions with obstacles by optimizing certain criteria. The computing device can simulate candidate trajectories and based on the registration and determine whether any robot component will collide with another object. If a candidate trajectory will result in a collision, the computing device can move on to a next candidate trajectory until it identifies a trajectory without a collision. The computing device can store collision data based on past collisions or past calculations. The computing device can further eliminate candidate trajectories based on the stored collision data. For example, the computing device can compare candidate trajectories to collision data to determine whether a collision is likely. If a collision has a probability less than the threshold probability, the candidate trajectory can be eliminated. If, however, a collision has a probability greater than a threshold probability, the candidate trajectory is not eliminated.

At 1014, the method can include the computing device classifying a real-world target type using a machine learning model based on scanned data of the surface of the target object. The computing device can receive image data of the target objects. For example, the computing device can transmit the trajectory to the robot with instructions to capture image data of the targets. The computing device can receive the image data and use the data as inputs for a neural network, such as a convolutional neural network (CNN). The neural network can receive the images and classes for each target. For example, the neural network can predict a class for each target such as fastener type, fastener diameter, or fastener material.

At 1016, the method can include the computing device generating a robot job file, where the robot job file comprises the trajectory, and an autonomous operation instruction. The computing device can convert trajectory, instructions for executing an end effector, and other relevant information into a file formatted to be executable by the robot. The robot job can identify target classes and include instructions for each class. For example, the robot job can instruct the robot to perform certain operations for certain fastener types and other operations for other fastener types. At 918, the method can include the computing device transmitting the robot job file to a robot controller.

Figure 11:
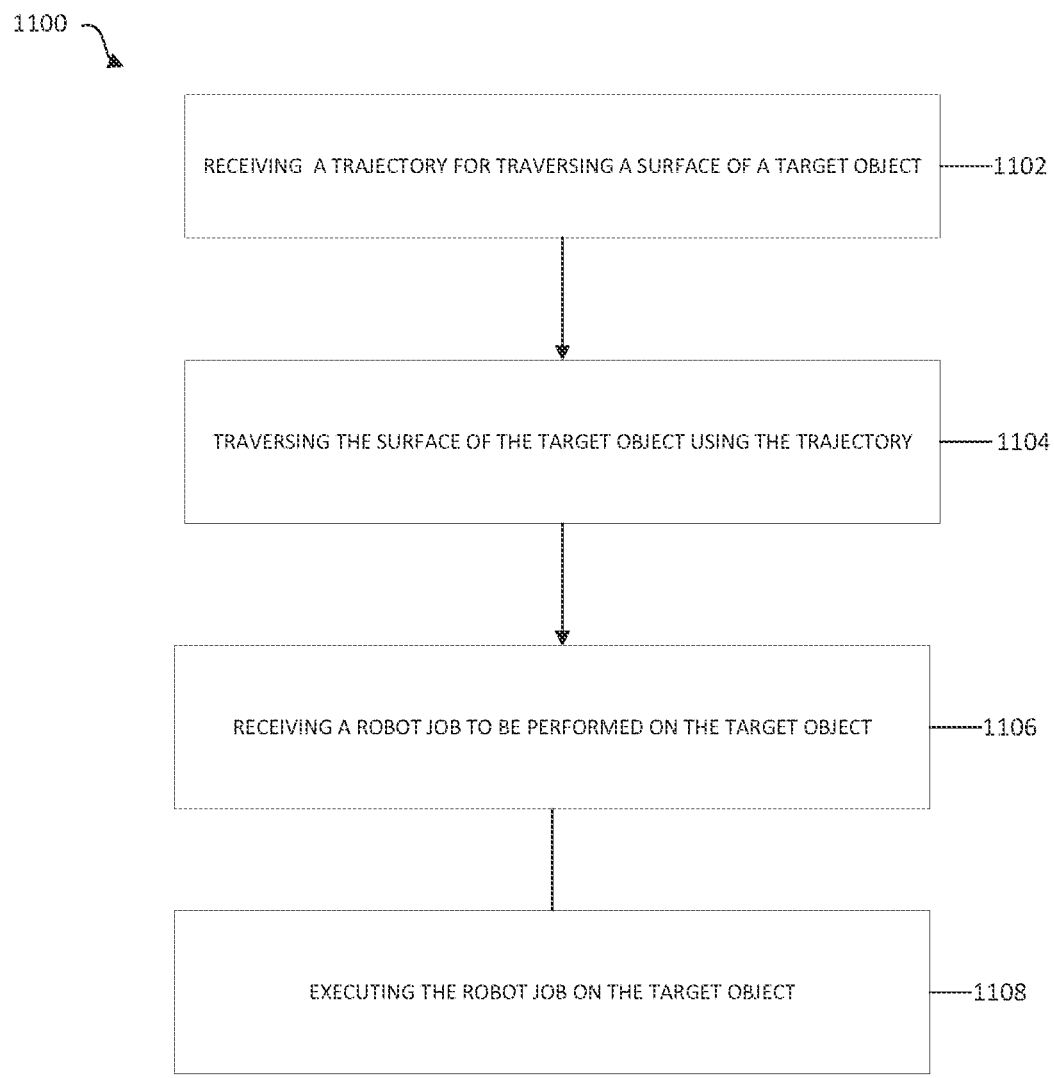
FIG. 11 is a process flow for guiding a robot, in accordance with one or more embodiments.

FIG. 11 is a process flow 1100 for executing an autonomous operation by a robot. At 1102, the method can include the robot receiving a trajectory for traversing a surface of a target object. The robot can receive the trajectory from a server, such as the server that calculated the trajectory.

At 1104, the method can include the robot traversing the surface of the target object using the trajectory. In addition to traversing the surface, the robot can be collecting data, such as image data from the surface of the target object. For example, the robot can include an image capturing device to capture images of the surface of the target object. The image data can include images of the targets to be used for classification of the targets. The image data can also be transmitted back to the server to be displayed on a UI in real-time.

At 1106, the method can include the robot receiving a robot job to be performed on the target object. The robot job can include instructions for performing an operation (e.g., drilling) at least one target on the surface of the target object. The robot job can be configured based on the trajectory, the robot's limitations, the intended job, and classification of the targets. In some embodiments, the robot job further includes a recalculated trajectory for traversing the surface of the target object. At 1108, the method can include the robot executing the robot job on the target object.

Figure 12:
FIG. 12 is a process flow for guiding a robot, in accordance with one or more embodiments.

FIG. 12 is process flow 1200 for decontamination of a target object, in accordance with one or more embodiments. FIG. 11 is provided as an illustration that the above-described systems and steps can be used for processes other than inspecting holes, drilling holes or removing fasteners. At 1202, the method can include a computing device registering a target object to a coordinate system of a robot. The computing device can be a server guided by user selections at a UI. For example, through the UI, the user can instruct the server to load a point cloud of a target object and identify targets on the surface of the target objects. The user can further use the UI to instruct the server to generate waypoints on a three-dimensional representation of the target object. The waypoints can be movable virtual makers that can be used to generate normals extending to and from the waypoints. The waypoints can further be used as points to generate a path. The user can further use the UI to register the target object to the coordinate system of the robot, and in particular the base of the robot.

At 1204, the method can include the computing device generating a path to traverse the surface of the target. The user can use the UI to select an input control to send instructions to the computing device to generate the path. To generate the path, the computing device can generate waypoints utilizing a series of algorithms. The waypoints are virtual points on the surface of the target object that can be used to generate a path over the surface of the target object. The computing device can further employ an optimization algorithm (e.g., TSP solver) to identify an optimal path over the surface of the target object. As described above, the user can use the UI to move one or more waypoints and therefore, the path can be generated above, on, or below the surface of the target object based on a user's positioning of the waypoints. The path can be robot agnostic to be usable by multiple robots. The generated path can further be stored in a database to be retrieved later. For example, the path can be reused for a subsequent robot operation on the target object.

At 1206, the method can include the computing device generating a first trajectory to traverse the surface of the target object based on the path and the registration. The user can use the UI to select an input control to send instructions to the computing device to generate the trajectory. The trajectory can be a set of movements for each robot component to follow the path while accounting for the limitations of the robot, and avoidance of collisions. The computing device can generate the trajectory based on implementing inverse kinematics techniques. The computing device can use inverse kinematics to generate a trajectory that guides the robot in real life such that the end effector has a desired pose along the trajectory. As described above, the computing device can generate a respective normal at each target using the waypoints. The normal can be used to properly guide the robot to approach and recede from a target at the correct orientation. The computing device can further transmit the trajectory to the robot to follow. For example, the computing device can transmit the trajectory with instructions to scan the surface of the target object with a sensor, such as an image capturing device or a sniffer. The scanned data can be based on the sensor used to collect the data. For example, the scanned data can be images collected by an image capturing device. In other instances, the scanned data can be measured of one or more characteristics of the surface of the target object or a material on or in the surface of the target object. The scanned data can further be presented to the user via the UI. For example, the UI can include a visualization pane for displaying the scanned data. In some instances, the scanning can be performed by the robot, and the UI can present the scanned data in real-time for the user.

At 1208, the method can include the computing device identifying a containment on the surface of the target object. The user can use the UI to select an input to send instructions to the computing device to identify a contaminant. The computing device can format the data for use with a neural network (e.g., CNN gated recurrent unit (GRU) network, long short-term memory network (LTSM)) and use the network to identify the contaminant. The UI can display the identified contaminant for the user. In other instances, rather than or in addition to receiving the identification, the user can view the scanned data on the visualization pane and manually input an identification of the contaminant into the UI.

At 1210, the method can include the computing device generating a second path to the containment based on the identification. The user can use the UI to select an input to send instructions to generate the second path. In some instance, the robot end effector is situated above the contaminant after scanning the surface of the target object, and in other instances, the robot end effector is situated away from the contaminant after scanning the surface of the target object. Therefore, the computing device can generate a second path from the position of the end effector to the contaminant. The second path can be generated using waypoints in the same manner as the path. However, unlike the path, the second path is not interested in traversing the surface of the target object. Rather the second path is concerned with an optimum path for reaching the contaminant. Similar to the first path, the second path is robot agnostic and can be stored in a database for reuse.

At 1212, the method can include the computing device generating a second trajectory based on the second path. The user can use the UI to select an input to send instructions to generate the second trajectory. The computing device can use inverse kinematic techniques to determine the respective motions for the robot components to follow to reach the contaminated area, and account for the robot's limitations, while avoiding collisions. The robotic arm can follow the trajectory and move the tool to the contaminated area. Although the trajectory is not robot agnostic, the second trajectory can also be stored in a database for reuse.

At 1214, the method can include the computing device generating a local pattern to decontaminate the contaminated area. The user can use the UI to select an input to send instructions to generate the local pattern. The local pattern can include any sequence of movements for applying or dispensing a decontamination solution on the contaminated area. The pattern can be effectuated by a motion of the end effector, a motion of the robotic arm, or a combination of a motion of the end effector and a motion of the robotic arm. The local pattern can be based on, for example, the contaminant, the solution used to remove the contaminant, the surface of the target object, or a combination thereof. The local pattern can be, for example, a raster pattern, concentric circles, or other pattern.

In some instances, the computing device can further verify that decontamination operation resulted in the decontamination of the target object. The computing device can cause the robotic arm to move a sensor (e.g., sniffer sensor) over the contaminated area and determine whether it can detect a contaminant. In other instances, the computing device can cause the robotic arm to move a sensor over the contaminated area, and transmit the collected data to a neural network, such as the neural network used to identify the contaminant. The neural network can be trained to process the sensor data and determine whether a contaminant is present on the target object. If either method results in a conclusion that the contaminant remains, the computing device can reinitiate decontamination.

Figure 13:
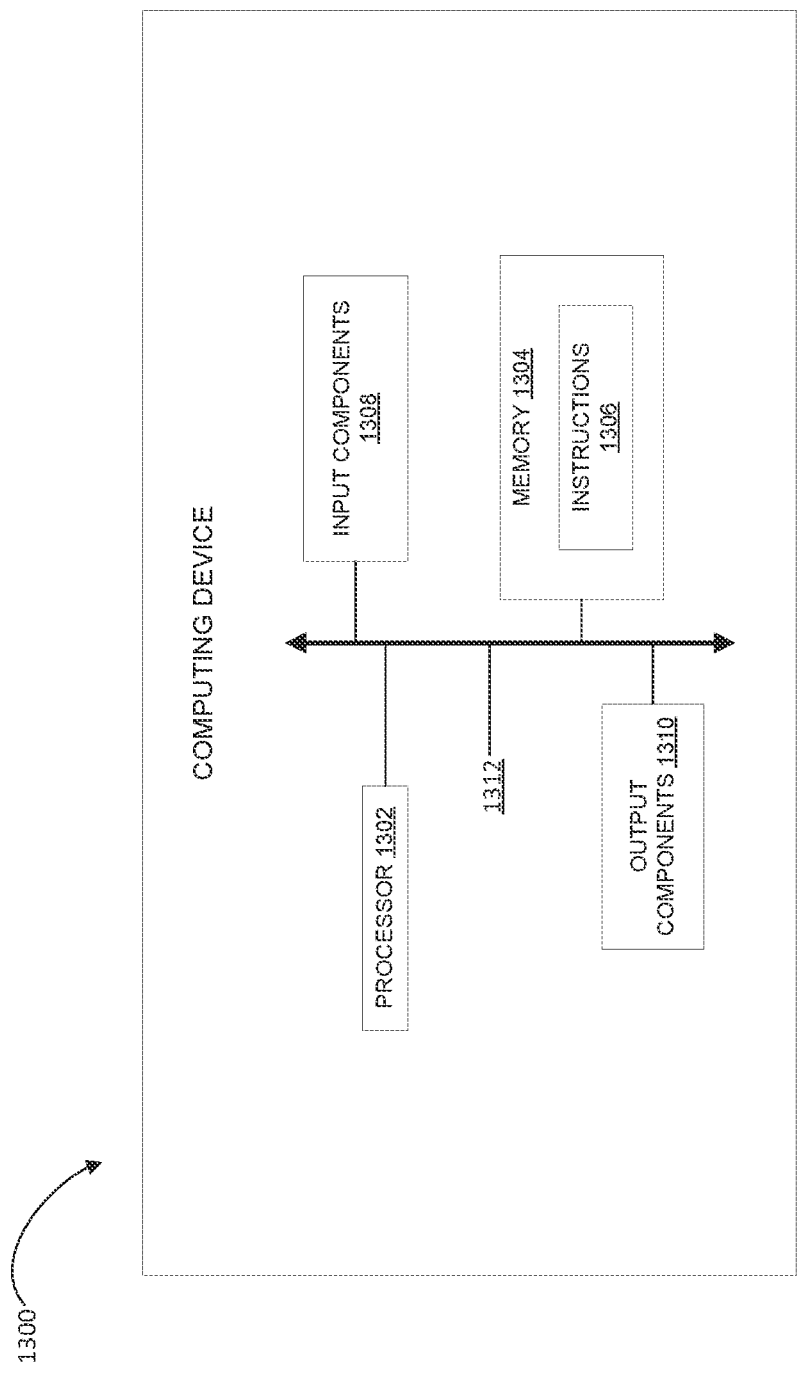
FIG. 13 is a block diagram of an example of a computing device, in accordance with one or more embodiments.

FIG. 13 is a block diagram of an example of a computing device 1300 usable for implementing some aspects of the present disclosure. The computing device 1300 includes a processor 1304 coupled to a memory 1304 via a bus 1312. The processor 1302 can include one processing device or multiple processing devices. Examples of the processor 1302 include a Field-Programmable Gate Array (FPGA), an application-specific integrated circuit (ASIC), a microprocessor, or any combination of these. The processor 1302 can execute instructions 1306 stored in the memory 1304 to perform operations. In some examples, the instructions 1306 can include processor-specific instructions generated by a compiler or an interpreter from code written in any suitable computer-programming language, such as C, C++, C #, Python, or Java.

The memory 1304 can include one memory device or multiple memory devices. The memory 1304 may be non-volatile and include any type of memory device that retains stored information when powered off. Examples of the memory 1304 can include electrically erasable and programmable read-only memory (EEPROM), flash memory, or any other type of non-volatile memory. At least some of the memory 1304 includes a non-transitory computer-readable medium from which the processor 1302 can read instructions 1306. A computer-readable medium can include electronic, optical, magnetic, or other storage devices capable of providing the processor 1302 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 1306.

The computing device 1300 may also include other input and output (I/O) components. The input components 1308 can include a mouse, a keyboard, a trackball, a touch pad, a touch-screen display, or any combination of these. The output components 1310 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    registering, by a device, a working frame of a target object with a reference frame of a robot;
    generating, by the device, a path over a representation of a surface of the target object, wherein the path comprises a virtual point and a normal at the virtual point, and wherein the virtual point corresponds to a real-world target;
    generating, by the device, a trajectory over the surface of the target object based on the registration, the path, and the normal, wherein the trajectory comprises a set of robot joint parameters used to traverse the surface of the target object, and wherein the trajectory traverses the real-world target;
    classifying, by the device, a target type for the real-world target using a machine learning model based on scanned data of the surface of the target object;
    generating, by the device, a robot job file, wherein the robot job file comprises the trajectory and an autonomous operation instruction, and
    transmitting, by the device, the robot job file to a robot controller.

2. The method of claim 1, wherein the method further comprises:
    clustering or segmenting data points of a point cloud representation of the target object to identify an object;
    determining whether a cluster respectively represents a real-world target based on identifying a feature associated with the real-world target; and
    calculating the normal for the cluster representing the real-world target based on the determination.

3. The method of claim 2, wherein the method further comprises:
    retrieving collision data comprising data of a first collision between the robot and the target object;
    simulating a first candidate trajectory and a second candidate trajectory;
    determining that the first candidate trajectory results in a second collision based on the collision data; and
    selecting the second candidate trajectory as the trajectory based on the determination.

4. The method of claim 1, wherein generating the trajectory is based on inverse kinematics.

5. The method of claim 1, wherein classifying the target type using a machine learning model comprises:
    receiving scanned data of the surface of the target object;

inputting the scanned data into the machine learning model, wherein the machine learning model is trained to identify a target object class; and
executing the machine learning model to classify the real-world target.

6. The method of claim 1, wherein the method further comprises:
receiving an indication that a position of the virtual point in relation to the target object has been modified; and
generating a second path based on the modification of the position of the virtual point.

7. The method of claim 1, wherein generating the path comprises using an optimization technique to identify a minimum length for traversing the surface of the target object.

8. A device comprising:
one or more processors;
a computer readable medium including instructions that, when executed by the one or more processors, cause the one or more processors to perform operations comprising:
registering a working frame of a target object with a reference frame of a robot;
generating a path over a representation of a surface of the target object, wherein the path comprises a virtual point and a normal at the virtual point, and wherein the virtual point corresponds to a real-world target;
generating a trajectory over the surface of the target object based on the registration, the path, and the normal, wherein the trajectory comprises a set of robot joint parameters used to traverse the surface of the target object, and wherein the trajectory traverses the real-world target;
classifying a target type for the real-world target using a machine learning model based on scanned data of the surface of the target object;
generating a robot job file, wherein the robot job file comprises the trajectory and an autonomous operation instruction, and
transmitting the robot job file to a robot controller.

9. The device of claim 8, wherein the instructions that, when executed by the one or more processors, further cause the one or more processors to perform operations comprising:
clustering or segmenting data points of a point cloud representation of the target object to identify an object;
determining whether a cluster respectively represents a real-world target based on identifying a feature associated with the real-world target; and
calculating the normal for the cluster representing the real-world target based on the determination.

10. The device of claim 9, wherein the instructions that, when executed by the one or more processors, further cause the one or more processors to perform operations comprising:
retrieving collision data comprising data of a first collision between the robot and the target object;
simulating a first candidate trajectory and a second candidate trajectory;
determining that the first candidate trajectory results in a second collision based on the collision data; and
selecting the second candidate trajectory as the trajectory based on the determination.

11. The device of claim 8, wherein generating the trajectory is based on inverse kinematics.

12. The device of claim 8, wherein classifying the target type using a machine learning model comprises:

receiving scanned data of the surface of the target object;
inputting the scanned data into the machine learning model, wherein the machine learning model is trained to identify a target object class; and
executing the machine learning model to classify the real-world target.

13. The device of claim 8, wherein the instructions that, when executed by the one or more processors, further cause the one or more processors to perform operations comprising:
receiving an indication that a position of the virtual point in relation to the target object has been modified; and
generating a second path based on the modification of the position of the virtual point.

14. The device of claim 8, wherein generating the path comprises using an optimization technique to identify a minimum length for traversing the surface of the target object.

15. A computer-readable medium including one or more sequences of instructions, when executed by one or more processors, cause the one or more processors to perform operations comprising:
registering a working frame of a target object with a reference frame of a robot;
generating a path over a representation of a surface of the target object, wherein the path comprises a virtual point and a normal at the virtual point, and wherein the virtual point corresponds to a real-world target;
generating a trajectory over the surface of the target object based on the registration, the path, and the normal, wherein the trajectory comprises a set of robot joint parameters used to traverse the surface of the target object, and wherein the trajectory traverses the real-world target;
classifying a target type for the real-world target using a machine learning model based on scanned data of the surface of the target object;
generating a robot job file, wherein the robot job file comprises the trajectory and an autonomous operation instruction, and
transmitting the robot job file to a robot controller.

16. The computer-readable medium of claim 15, wherein the instructions that, when executed by the one or more processors, further cause the one or more processors to perform operations comprising:
clustering or segmenting data points of a point cloud representation of the target object to identify an object;
determining whether a cluster respectively represents a real-world target based on identifying a feature associated with the real-world target; and
calculating the normal for the cluster representing the real-world target based on the determination.

17. The computer-readable medium of claim 16, wherein the instructions that, when executed by the one or more processors, further cause the one or more processors to perform operations comprising:
retrieving collision data comprising data of a first collision between the robot and the target object;
simulating a first candidate trajectory and a second candidate trajectory;
determining that the first candidate trajectory results in a second collision based on the collision data; and
selecting the second candidate trajectory as the trajectory based on the determination.

18. The computer-readable medium of claim 15, wherein generating the trajectory is based on inverse kinematics.

19. The computer-readable medium of claim 15, wherein classifying the target type using a machine learning model comprises:
- receiving scanned data of the surface of the target object;
- inputting the scanned data into the machine learning model, wherein the machine learning model is trained to identify a target object class; and
- executing the machine learning model to classify the real-world target.

20. The computer-readable medium of claim 15, wherein the operations further comprise:
- receiving an indication that a position of the virtual point in relation to the target object has been modified; and
- generating a second path based on the modification of the position of the virtual point.

* * * * *